May 5, 1959 D. EIGEN 2,885,485

SOUND EDITING DEVICE

Filed June 22, 1956 3 Sheets-Sheet 1

INVENTOR

DAVID EIGEN

BY James G. Bethell

ATTORNEY

May 5, 1959 D. EIGEN 2,885,485

SOUND EDITING DEVICE

Filed June 22, 1956 3 Sheets-Sheet 2

INVENTOR
DAVID EIGEN
BY James G. Bethell
ATTORNEY

INVENTOR
DAVID EIGEN

BY James G. Rietere

ATTORNEY 2,885,485

SOUND EDITING DEVICE

David Eigen, Passaic, N.J.

Application June 22, 1956, Serial No. 593,160

8 Claims. (Cl. 179—100.1)

The present invention relates to editing motion picture film, more particularly with respect to the sound recorded thereon.

Certain features of the invention relate to editing sound recorded on tape as well as to sound recorded on film.

An object of the invention is to provide a procedure and apparatus whereby it is possible to locate and mark the locations of desired passages, words or even single syllables with precision.

A further object is to make it possible to repeat the desired item of the sound record as often as necessary so that appraisement and any requisite correction thereof may be made easily.

A still further object is to provide apparatus and procedure whereby such editing may be accomplished accurately and expeditiously.

An additional object is to provide apparatus and procedure whereby the sound record may be reproduced audibly while the carrier thereof, whether film or tape, is fed either forward or backward, or even while it is held stationary, without altering the time rendering of the sound.

Other objects and advantages of the invention in part will be pointed out specifically in the following description, and in part will be self-evident from the structures and procedures disclosed in the specification and drawings illustrating the invention.

In said drawings.

Similar reference characters are applied to similar parts in all the views.

Figure 1:
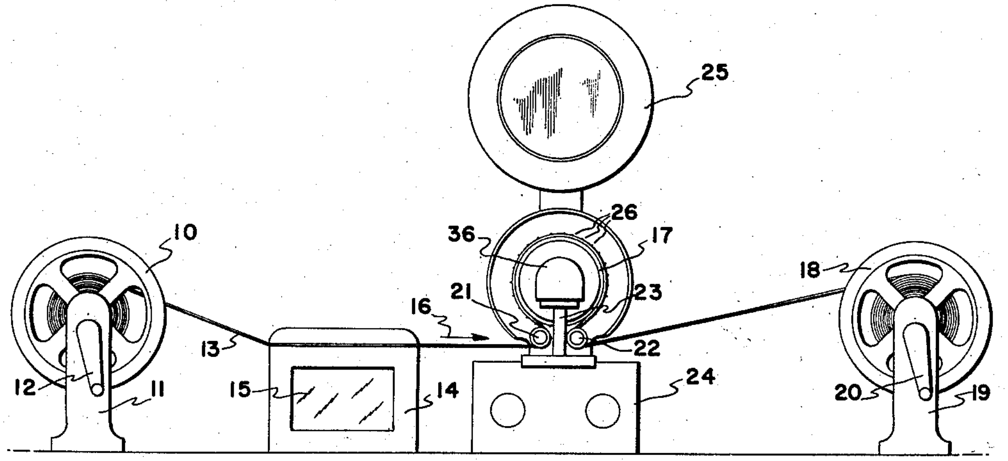
Fig. 1 is an elevation of a complete editing apparatus, showing the general relationships of the parts thereof.

Referring first to Fig. 1, there is shown a supply reel 10 rotatably mounted on an upright standard 11 and operable by a hand crank 12 in the conventional manner to wind the film or tape 13 on the reel when desired. The film or tape next passes through the viewer 14 where a selected frame may be projected on the screen 15 when the film is at rest, or the action may be seen when the film is in motion. The arrow 16 shows the "forward" direction of film feed.

The film or tape next passes around the scanning drum 17 which is a part of the sound reproducing means, which will be described presently, and then passes to the take-up reel 18 carried by the standard 19 and operated by the crank 20. The take-up means and the supply means are usually identical with one another, and it will be understood that the film or tape may be fed in either the forward or reverse direction, by manipulating crank 20 or crank 12 respectively.

Passing now to a discussion of the scanning means, this comprises the drum 17 already mentioned, guide rollers 21 and 22, a support 23 carrying the axle about which the drum turns, an amplifier 24 and a speaker 25. The drum 17 has sprocket teeth which engage in the perforations of the film, whereby the said film will cause the drum to rotate when the film is fed in either direction as will be described fully below. The amplifier and speaker may be of conventional construction and therefore will not be described in detail herein.

Figure 2:
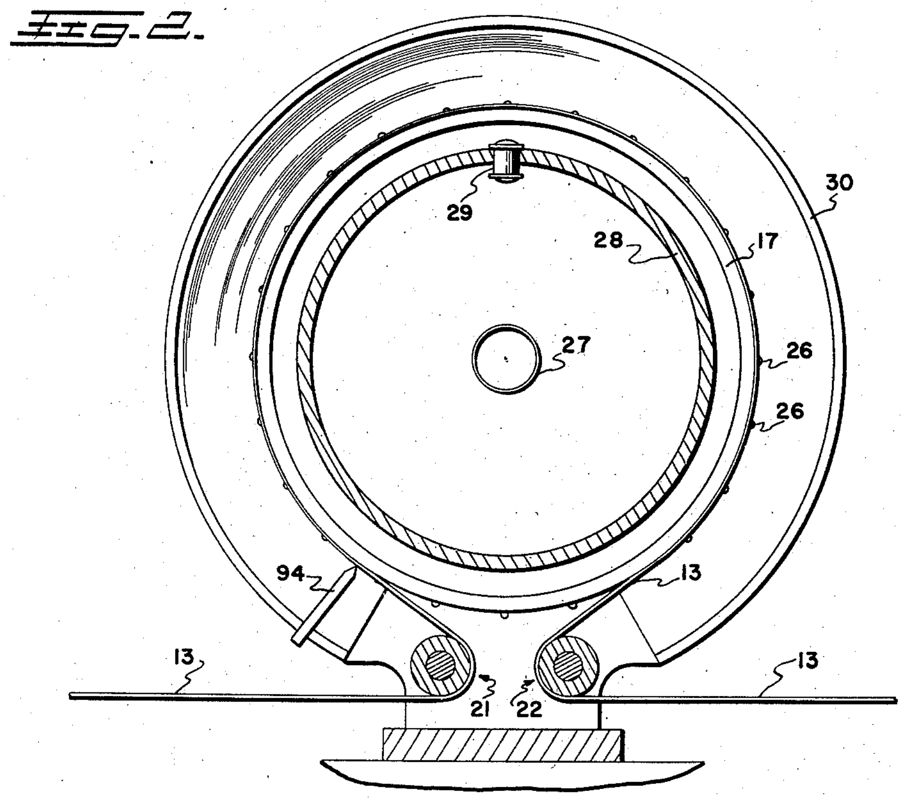
Fig. 2 is an elevation of a scanning drum forming a part of said apparatus, but shown on a larger scale and partly in section on plane 2—2 of Fig. 3.

Attention is next directed to Fig. 2 which illustrates the operation of the scanning means. The drum 17 has the sprocket teeth 26 whereby the film 13 will be caused to engage said drum without slip and will cause the drum to rotate in one direction or the other, dependent upon the direction of feed of said film.

Located axially of the drum 17 is a lamp 27, preferably one with a straight filament which may be adjusted closely into the axis of the drum, so that the illumination from said filament will be as nearly uniform as possible on all parts of the interior cylindrical surface of said drum. Within the drum and arranged to turn about the same axis, is the opaque inner drum 28 which carries a lens system 29 having its optical axis radial to both the said drums, so that the filament of lamp 27 will always intersect said optical axis. Thus when drum 28 rotates, the lens system 29 will cause a beam of light to "scan" the outer drum continuously in the plane of said lens system. Concentrically surrounding the outer end of drum 17 is a reflector 30 which will be described in detail in connection with Fig. 3.

Figure 3:
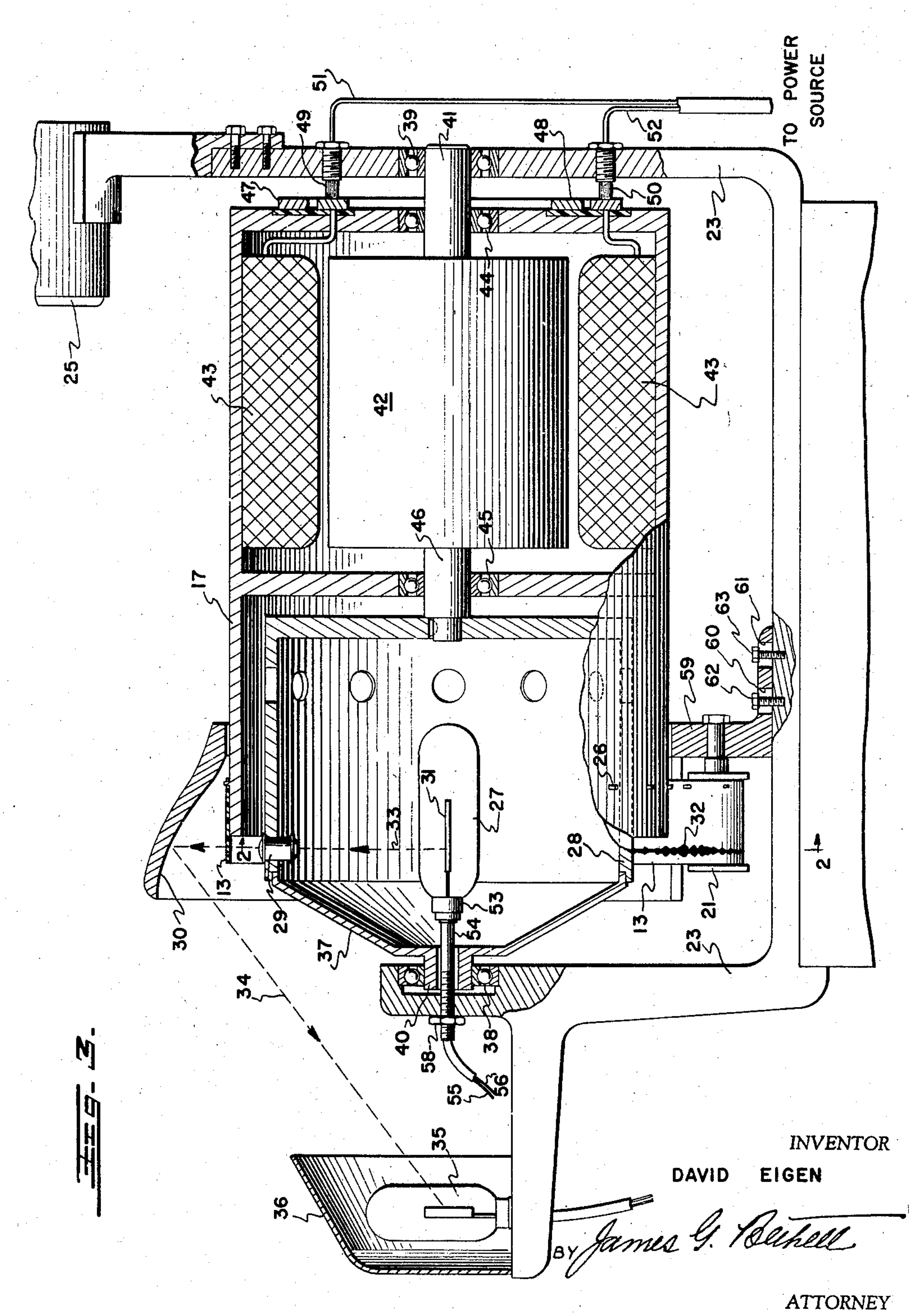
Fig. 3 is a view on approximately the same scale as Fig. 2, partly broken away and in axial section showing details of the scanning means and associated parts.

Fig. 3 shows the relationships of some of the structures just described. The filament 31 of lamp 27 is shown, axially located within drum 28 and near the outer end of said drum. Drum 28 extends beyond the corresponding end of drum 17, and lens system 29 is located properly to form an image of filament 31 in the mathematical cylindrical surface that forms an extension of the outer surface of drum 17. The film 13 has its perforations engaged with the sprocket teeth 26, which maintain the film in constant register with the drum, with one edge portion of the film projecting beyond the end of said drum. This edge portion carries the sound track 32 in proper register to cause the image of filament 31 to scan said sound track continuously.

The light from said image proceeds through the film in the course indicated by the beam 33 which then strikes the inner surface of reflector 30 and is reflected as beam 34 to a photoelectric device, such as photocell 35. The exact nature of the curvature of this reflector 30 is not important, provided that it is shaped as a true surface of revolution symmetrical about the axis of the drum, so that the light reflection will always remain the same during rotation of the drum 28, and provided further that most of the light will reach the photocell 35 after reflection. Possibly a paraboloid or ellipsoid of revolution will be found most effective; for instance, a section of a reflector such as is used in automobile headlamps will be satisfactory for this purpose. Precise focusing is not as important as is uniformity of illumination of the photocell 35 during rotation of the drum 28, so that true rendering of both the "pitch" and the intensity of the sound track may be attained.

It is possible to simplify the device by using a photovolatic surface at 30 instead of a mere reflecting surface. In this case the photo-electric cell 35 becomes unnecessary and the surface 30 may be connected directly to the amplifier 24. Such photo-voltaic surfaces are commonly used in light-meters but are not as rapid in response to light variations as is the photo-electric cell, which is therefore preferred at present.

Attention is now directed more particularly to the mechanical and electrical structures of Fig. 3. Without limiting the device to any definite range of sizes, it may be remarked that this figure shows the apparatus on an enlarged scale; actually, for 16 mm. film, the outer circumference of drum 17 may be about 9 inches, and somewhat more for 35 mm. film.

The photocell 35 is protected from stray light by the shield 36 which covers the portion facing away from the drums, while permitting light to pass freely to the photocell from the reflector 30. A second light shield 37, of frusto-conical shape, covers the end of the inner drum 28 and prevents light from passing directly to the photocell from the exciter lamp 27.

The support 23, already mentioned, is shown in detail as having ball bearings 38 and 39 carried thereby to support the shafts 40 and 41 at opposite ends of the rotating structures. The shaft 41 may be solid and is part of an electric motor structure, comprising the rotor 42 which revolves within the field or stator 43. The rotor has a shaft 46 at its other end, which carries the inner drum 28. The shaft 40 is tubular and is secured to the shield 37 which in turn is secured to the adjacent end of the drum 28. Thus the armature or rotor 42 will cause the inner drum 28 to rotate about its axis, within the outer drum 17.

The outer drum 17 carrying the field or stator also revolves about the same axis, but independently of the rotor. This is accomplished by means of the ball-bearings 44 and 45 whose inner races are carried by the shafts 41 and 46 and whose outer races are secured to the outer drum 17 as shown. Current is fed to the stator by the slip rings 47 and 48, through brushes 49 and 50 connected by conductors 51 and 52 to a suitable power source.

The exciter lamp 27 is mounted in a socket 53 carried by a hollow threaded stud 54 extending through hollow shaft 40. The wires 55 and 56 pass through this stud 54 and are connected to a suitable power source. The stud 54 is adjustable slightly in axial and radial directions, to permit accurate centering of the exciter lamp filament 31 with respect to the drum 17. It will be understood that exciter lamps are "pre-focused" by the manufacturer so that little adjustment is needed.

A slight adjustment of the bracket 59 which supports the reflector 30 may be provided by slightly elongated holes at 60 and 61 through which pass the screws 62 and 63 which secure the bracket 59 to the frame or support 23.

The operation of the apparatus just described is as follows. Referring to Fig. 1, the film 13 will be threaded through the mechanism as shown, passing from the supply reel 10 through the viewer 14 and then to and partly around the drum 17, guided by the rollers 21 and 22, and finally to the take-up reel 18. As already mentioned, it may at times be necessary or desirable to run the film backward, that is, opposite to the normal forward direction shown by arrow 16. This may be done at any time by operating reel 10 as a take-up reel.

The guide rollers and the sprocket teeth 26 position the film so that the portion that contains the sound record overhangs the edge of drum 17 as shown in Fig. 3.

The lens system 29 is properly positioned to cast an image of the filament 31 on the sound record, said image being a thin line of light parallel to the axis of rotation of the drum.

As the inner drum 28 rotates with respect to the outer drum, this line of light will continuously scan the sound record, always in the proper direction to render the sound correctly and always at the proper angular velocity to render the sound at its proper rates of vibration. The light passes through the sound record to the reflector 30, which is properly located and shaped to converge it to the photocell 35. The output of said tube, after amplification by amplifier 24, energizes the speaker 25, to reproduce the sound. Inasmuch as the reflector has a gap at its lower position, there will be one interruption of the sound for each turn of the inner drum 28.

The circumference of drum 17 is made long enough to cover a reasonably large portion of sound, to facilitate identification of the location of said sound on the film. It is to be noted that in my improved device or apparatus the film can be edited while being fed forward or backward at any desired speed as well as when it is at a standstill. This is due to the fact that my device automatically maintains a constant difference between the speed of the scanning means and the speed of the record film whereby the scanning rate remains fixed when the film is standing still or moving in either direction at any speed. This constant speed relation is easily attained because the two drums are in the relation of stator and rotor of an electric motor whose speed can easily be constant, as by synchronism in an A.C. motor.

The only indication of film speed through the apparatus is that, if the film is fed at normal speed, there will be normal sound reproduced, free from gaps or overlaps. Should the film be fed above normal speed, there will be gaps in the sound, and if fed below normal speed there will be overlaps, that is, partial repetitions. No distortion of the sound will ever occur, however, regardless of speed or direction of film feed and this constitutes a very important feature of the invention.

When the film or tape traverses the apparatus in the backward direction, but at or near normal speed, there will be correct intelligible renderings of phrases equal to the length of record engaged around the outer drum, but these phrases will occur in opposite order to that on the record itself. If this reverse speed is decreased, overlapping will occur (that is, partial repetitions) and if increased above normal, there will be progressively larger gaps between the phrases.

Figure 4:
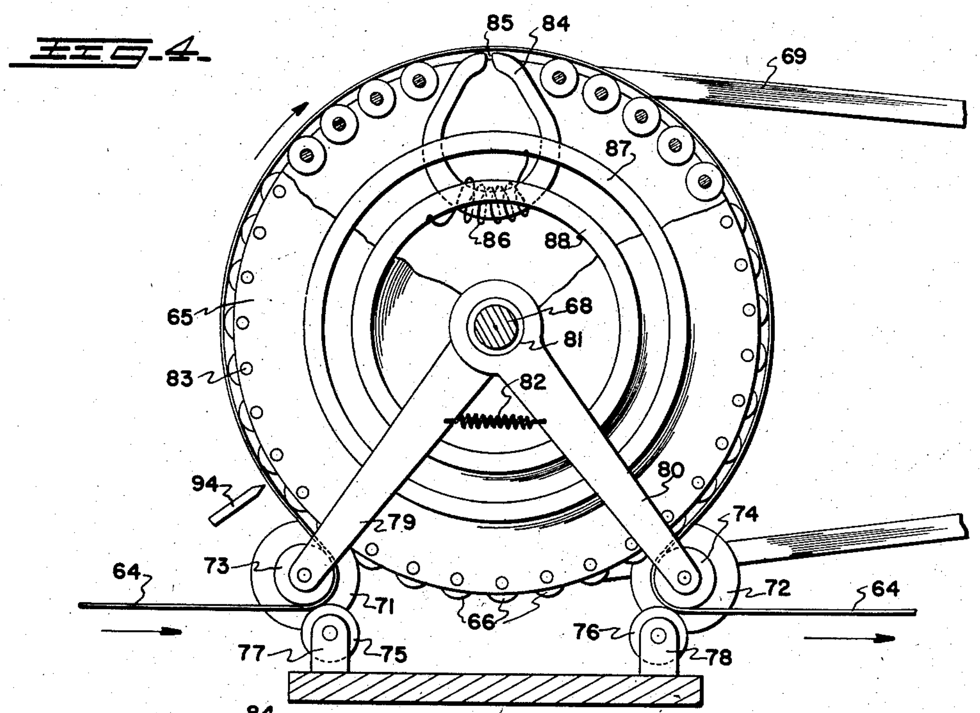
Fig. 4 is a front elevation, partly broken away and with the shaft and base in cross section, showing the invention applied to tape records.

In order to mark the particular location at which editing is required in the sound record, whether film or tape, a marking device 94 may be provided as indicated on Figs. 2 and 4. This marking device will be of any suitable type, and the mark made thereby may be of any desired nature.

In order to locate a desired point on the sound record, the film may first be run through at normal or even higher speed, until the general vicinity of the desired point is found. Then the feed may be slowed down and reversed to traverse the same point again as often as necessary, but much more slowly, to locate the point with greater precision and finally the feed may be stopped completely, if desired, so that the syllables containing the wanted point are repeated over and over again, giving the operator ample opportunity to judge its adequacy or inadequacy, as the case may be. When this has been accomplished marker 94 may be actuated to produce a mark on the record.

This procedure saves a great deal of time for two main reasons, first, the speed of the film through the device need not be standard in order to enunciate the syllables properly; it may be passed very rapidly in order to locate the general area desired, and then very slowly to edit extremely closely, and second, the direction of feed of the film need not be forward, inasmuch as the syllables are never pronounced backward regardless of the direction of film feed, thus dispensing with the need for any re-reeling solely to run the film forward.

Figure 5:
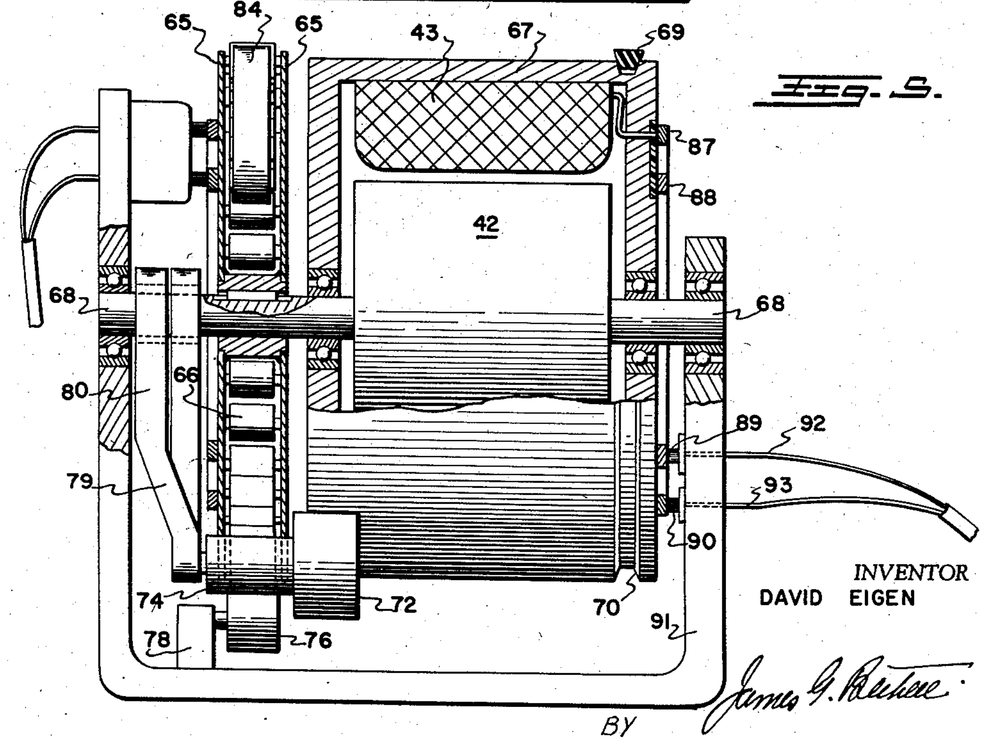
Fig. 5 is a corresponding side view, partly broken away and in vertical axial section.

Referring now more particularly to Figs. 4 and 5, showing the invention applied to magnetic tape records, it will be noted that the same principles apply as for film. Changes are necessary for two main reasons: The first is, that such tape conventionally is narrow, and the second is that tape lacks the rigidity of film. For these reasons, a support must be provided for the entire width of the tape record.

In Fig. 4, the tape 64 is shown coming from the left, passing over and partly around the double wheel 65 which carries a large number of rollers 66, and leaving to the right, as indicated by the arrows. This wheel is carried by the shaft 68 of the rotor or armature 42, which may be the same as the corresponding member of Fig. 3, and cooperates with the stator or field 43 carried by the drum or casing 67, as shown.

Drum 67 has the slip rings 87 and 88 mounted thereon, said rings coacting with the brushes 89 and 90 and conductors 92 and 93 to supply electric power to the field winding 43, to drive rotor 42. The drum 67 is rotatable about the shaft 68 and has a V-groove 70 near one end. A belt 69 may be engaged in said groove, to drive the drum, either manually or by any convenient source of motive power.

This drum 67 rests against and thus frictionally rotates two rubber-faced rollers 71 and 72, which carry respectively the rollers 73 and 74 around which the tape 64 passes, as shown. Idler rollers 75 and 76, mounted in suitable bearings 77 and 78, make contact with the other face of the tape. When the drum 67 turns the rollers 73 and 74 by the above described means, the tape will be fed positively around the wheel 65. In order to maintain proper uniform pressure against the tape, the rollers 71, 72, 73 and 74 are mounted on arms 79 and 80, pivotally hinged at 81 concentric with the axis of the wheel 65, and tensioned by a spring 82 of a suitable strength.

The individual rollers 66 are pivotally mounted on short shafts 83 carried by the double wheel 65, so as to minimize friction with respect to the tape. A reproducer head or scanning device 84 of conventional type has its airgap in contact with the magnetic tape as shown at 85 so that this part of the head 84 slides with respect to the tape in the usual way. When the tape moves forward at normal speed, the head 84 will remain at rest and the tape will slide over the head in the conventional way. In all other cases, the head will have an angular velocity other than zero, in one direction or the other, but always such that the relative motion of tape and head is in the proper direction and at the proper speed to render the sound correctly. This result is precisely analogous to that attained with the film, already described in detail.

It will be noted that the head 84 comprises the usual winding 86. The terminals of this winding are connected to the slip rings 87 and 88, upon which bear the brushes 89 and 90 carried by the frame 91 and connected to the conductors 92 and 93 which lead to the conventional amplifier-speaker apparatus, to reproduce the sound carried by the magnetic tape.

In the operation of this embodiment of my invention, as pointed out in connection with the first embodiment described, the tape can be edited while being fed forward or backward at any desired speed as well as when it is at a standstill. This is due to the fact, as pointed out in connection with the first embodiment described, that my device automatically maintains a constant difference between the speed of the scanning means and the speed of the record tape whereby the scanning rate remains fixed when the tape is standing still or moving in either direction at any speed.

I claim:

1. An editing device for a flexible sound record, comprising two coaxially mounted rotatable drums, said drums being rotatable with respect to one another, the outer drum being driven by the sound record, means for rotating the inner drum, scanning means carried by the inner drum to scan said sound record, and means automatically to maintain a constant difference between the speed of the scanning means and the speed of the sound record whereby the scanning rate remains fixed when the record is at a standstill as well as when it is moving in either direction at any speed.

2. An editing device for editing flexible sound records, said device comprising means for feeding the record at any desired speed in either direction; means for scanning the record when the record is standing still and when it is being fed in either direction at any speed; and means automatically to maintain a constant difference in speed between the speed of the scanning means and that of the flexible sound record, so that the scanning rate will remain fixed with the record at rest as well as with the record being fed in either direction and at any speed.

3. An editing device for a flexible sound record, which comprises a scanning means, a rotatable support for the sound record mounted to hold the record in cooperative relation to the scanning means, means for rotating said scanning means, and means automatically to maintain a constant difference in speed between the scanning means and the flexible sound record, so that the scanning rate will remain fixed with the record at rest as well as when the record is being fed in either direction and at any speed.

4. An editing device for a flexible sound record, which comprises a substantially cylindrical support for the record, means for rotating said support about its axis to carry the record therewith, scanning means for the record mounted to rotate about the same axis and in scanning relationship to said record, and electrical means for driving said scanning means automatically to maintain a constant different in speed between the scanning means and the flexible sound record, to maintain a fixed scanning rate with the record at rest as well as with the record being fed in either direction and at any speed.

5. An editing device for a flexible sound record, which comprises an electric motor having a rotor element and a field element, means supporting said rotor and field elements for individual independent rotation about a common axis, means carried by one of said elements for supporting said sound record to cause said record to feed upon rotation of said last named element, and scanning means carried by the other element in cooperative relation to said record, said rotor and field elements being so electrically coupled as automatically to maintain a constant difference in speed between the scanning means carried by one of said elements and the record.

6. An editing device for a flexible record including a sound track, which comprises two rotatable coaxially mounted concentric cylindrical members, the outer member having sprocket teeth near one end to engage the flexible record, said teeth being so located that the sound track extends beyond the said end, a light source arranged axially of the members, the inner cylindrical member having an image forming optical system secured thereto in position to cast an image of said light source on said sound track, means to rotate said members at a constant relative speed, a photo-sensitive device, and means to collect the light transmitted through said sound track and direct it upon the photo-sensitive device.

7. An editing device for a magnetic tape, comprising anti-friction guiding means arranged in a substantially cylindrical series, for supporting said tape, means for rotating said guiding means, means for feeding the tape partially around said guiding means, a reproducer head carried by said guiding means and adapted to slide along said tape, and means automatically to cause the difference between the speed of sliding of the reproducer head and the speed of the said tape to remain constant, whereby the rate of scanning of the tape by the reproducer head remains fixed when the tape is at rest as well as when it is moving in either direction at any speed.

8. An editing device for a magnetic tape comprising anti-friction guiding means arranged in a substantially cylindrical series, for supporting said tape, means for rotating said guiding means, means for feeding the tape partially around said guiding means, a reproducer head carried by said guiding means and adapted to slide along said tape, and means automatically to cause the difference between the speed of sliding of the reproducer head and the speed of the said tape to remain constant, said last named means comprising an electric motor having a rotor and a stator, one of which actuates the feeding of the tape and the other the rotation of the reproducer head.

References Cited in the file of this patent

UNITED STATES PATENTS

| | | |
|---|---|---|
| 757,715 | Aylsworth | Apr. 19, 1904 |

| | | |
|---|---|---|
| 1,461,852 | Kasley | July 17, 1923 |
| 2,352,023 | Schuller | June 20, 1944 |
| 2,528,699 | Masterson | Nov. 7, 1950 |
| 2,540,406 | Ranger | Feb. 6, 1951 |
| 2,611,828 | Gunby | Sept. 23, 1952 |
| 2,832,840 | Morin | Apr. 29, 1958 |